United States Patent [19]
Tserng

[11] Patent Number: 5,694,663
[45] Date of Patent: Dec. 9, 1997

[54] RETRACTABLE LUGGAGE HANDLE ASSEMBLY

[76] Inventor: Yueh-Chy Tserng, No. 26-21, Shi She Juang, Shi She Li, Chang Hua, Taiwan

[21] Appl. No.: 515,168

[22] Filed: Aug. 15, 1995

[51] Int. Cl.$^6$ ...................................... B62B 1/12
[52] U.S. Cl. .................. 16/115; 280/655; 403/327
[58] Field of Search ................... 280/37, 47.26, 280/655; 190/115, 39; 16/115; 403/327, 322, 109

[56] References Cited

U.S. PATENT DOCUMENTS

| | | | |
|---|---|---|---|
| 4,896,897 | 1/1990 | Wilhelm | 280/655 |
| 5,199,811 | 4/1993 | Huang | 403/109 |
| 5,308,103 | 5/1994 | Chin-Shung | 280/655 |
| 5,351,984 | 10/1994 | Cheng | 280/655 |
| 5,367,743 | 11/1994 | Chang | 16/115 |
| 5,371,923 | 12/1994 | Chang | 16/115 |
| 5,414,895 | 5/1995 | Kazmark | 16/115 |
| 5,431,428 | 7/1995 | Marchwiak et al. | 16/115 |
| 5,499,702 | 3/1996 | Wang | 190/115 |
| 5,542,150 | 8/1996 | Tu | 16/115 |

*Primary Examiner*—M. Rachuba
*Assistant Examiner*—Christopher Kirkman
*Attorney, Agent, or Firm*—Charles E. Baxley, Esq.

[57] ABSTRACT

A handle includes a pair of pipes slidably engaged in a pair of tubes and having a handle secured on top. A hand grip is slidably engaged in the handle. An actuator is secured to the hand grip so as to be moved by the hand grip. A latch may engage with the pipes and the tubes so as to prevent the pipe from moving relative to the tube. An actuator includes a cam for engaging with the latch so as to disengage the latch from the tube when the actuator is moved toward the handle by the hand grip. The latch can be easily moved by the actuator.

1 Claim, 5 Drawing Sheets

5,694,663

RETRACTABLE LUGGAGE HANDLE ASSEMBLY

BACKGROUND OF THE INVENTION

1. Field of the Invention

The present invention relates to a handle, and more particularly to a retractable luggage handle assembly.

2. Description of the Prior Art

The closest prior art of which applicant is aware is his prior U.S. Pat. No. 5,397,151 to Jserng.

The present invention has arisen to provide a novel structure.

SUMMARY OF THE INVENTION

The primary objective of the present invention is to provide a retractable luggage handle assembly which may be easily operated.

In accordance with one aspect of the invention, there is provided a handle assembly comprising a pair of tubes including a lower portion having an aperture formed therein and including an upper portion having an orifice formed therein, a pair of pipes slidably engaged in the tubes and including a lower portion having a hole formed therein and including an upper portion having a handle secured thereon, a hand grip slidably engaged in the handle, means for biasing the hand grip downward and outward of the handle, link means engaged in the pipes and secured to the hand grip so as to be moved in concert with the hand grip, a first actuator secured to the link means and moved in concert with the link means, the first actuator including a first cam means provided therein, and a first securing means engaged in the lower portion of the pipes and including a first latch means for engaging with the hole and the orifice so as to secure the pipe to the tube and so as to prevent the pipe from moving relative to the tube, and means for biasing the first latch means to engage with the hole and the orifice, the first cam means of the first actuator being engaged with the first latch means so as to disengage the first latch means from the orifice when the first actuator is moved toward the handle by the hand grip.

The first latch means includes at least one ear extended therefrom for engaging with the first cam means so as to allow the first latch means to be disengaged from the orifice by the first cam means.

A pair of ducts may slidably receiving the tubes therein, the ducts include an upper portion having an opening formed therein, a second securing means is engaged in the lower portion of the tubes and includes a second latch means for engaging with the opening and the aperture so as to secure the ducts to the tubes, a spring means is provided for biasing the second latch means to engage with the opening, a second actuator includes a second cam means for engaging with the second latch means, and another spring means is provided for biasing the second actuator toward the pipes so as to allow the second latch means to engage with the opening, the second latch means is disengaged from the opening by the second cam means when the second actuator is moved against the biasing means by the pipes.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
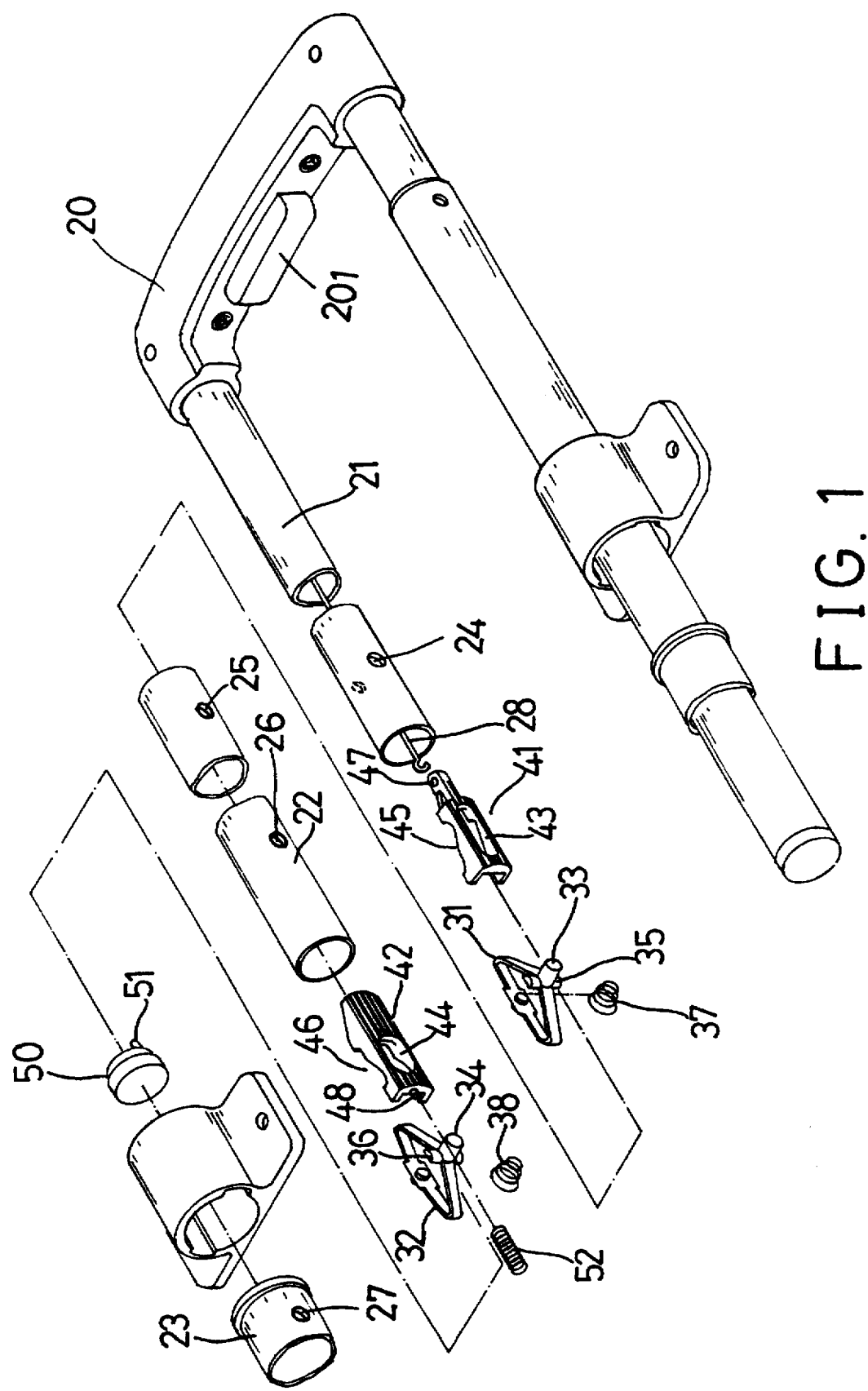
FIG. 1 is an exploded view of a retractable luggage handle assembly in accordance with the present invention.
Figure 2:
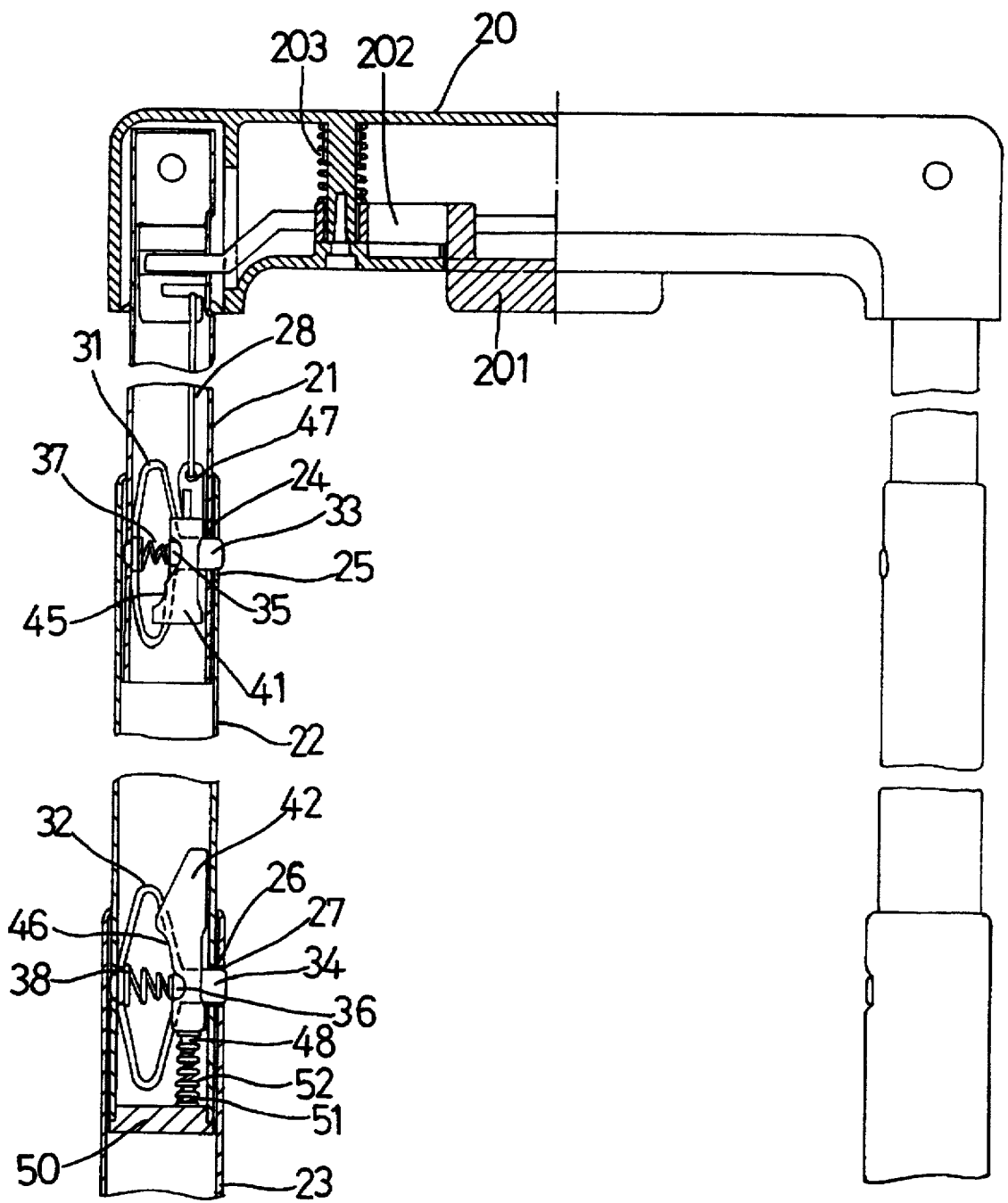
FIG. 2 is a partial cross sectional view of the retractable luggage handle assembly.

Referring to the drawings, and initially to FIGS. 1 and 2, a retractable luggage handle assembly in accordance with the present invention comprises two pipes 21 slidably engaged in two tubes 22 respectively and the tubes 22 are slidably engaged in two ducts 23 respectively. The pipes 21 include a handle 20 secured on top thereof and include a hand grip 201 slidably engaged in the handle 20. A beam 202 is secured to the hand grip 201 and moved in concert with the hand grip 201. A spring 203 is engaged between the handle 20 and the beam 202 so as to bias the hand grip 201 outward of the handle 20. A pair of links 28 are engaged in the pipes 21 and are secured to the beam 202. The pipes 21 each includes a hole 24 formed in the lower portion. The tubes 22 each includes an orifice 25 and an aperture 26 formed in the upper and lower portion respectively. The ducts 23 each includes an opening 27 formed in the upper portion.

A catch means 31 is engaged in the lower portion of the pipe 21 and includes a O-shaped body having a latch 33 for engaging with the hole 24 and with the orifice 25 so as to secure the tube 22 and the pipe 21 together. A spring 37 is engaged in the body 31 for biasing the latch 33 to engage with the hole 24 and the orifice 25. The latch 33 includes a pair of ears 35 oppositely and laterally extended therefrom. An actuator 41 includes a hole 47 for engaging with the link 28 so as to be secured to the link 28. The actuator 41 includes an oblong hole 43 formed therein for engaging with the latch 33 and for allowing the latch 33 to slide along said oblong hole 43. The actuator 41 includes a cam surface 45 formed therein for engaging with the ears 35 and for disengaging the latch 33 from the tube 22 when the actuator 41 is pulled toward the handle 20 by the link 28 and the hand grip 201 (FIG. 4). The latch 33 is allowed to engage with the tube 22 when the actuator 41 and the link 28 and the beam 202 are moved downward by the spring 203 (FIG. 3).

Figure 5:
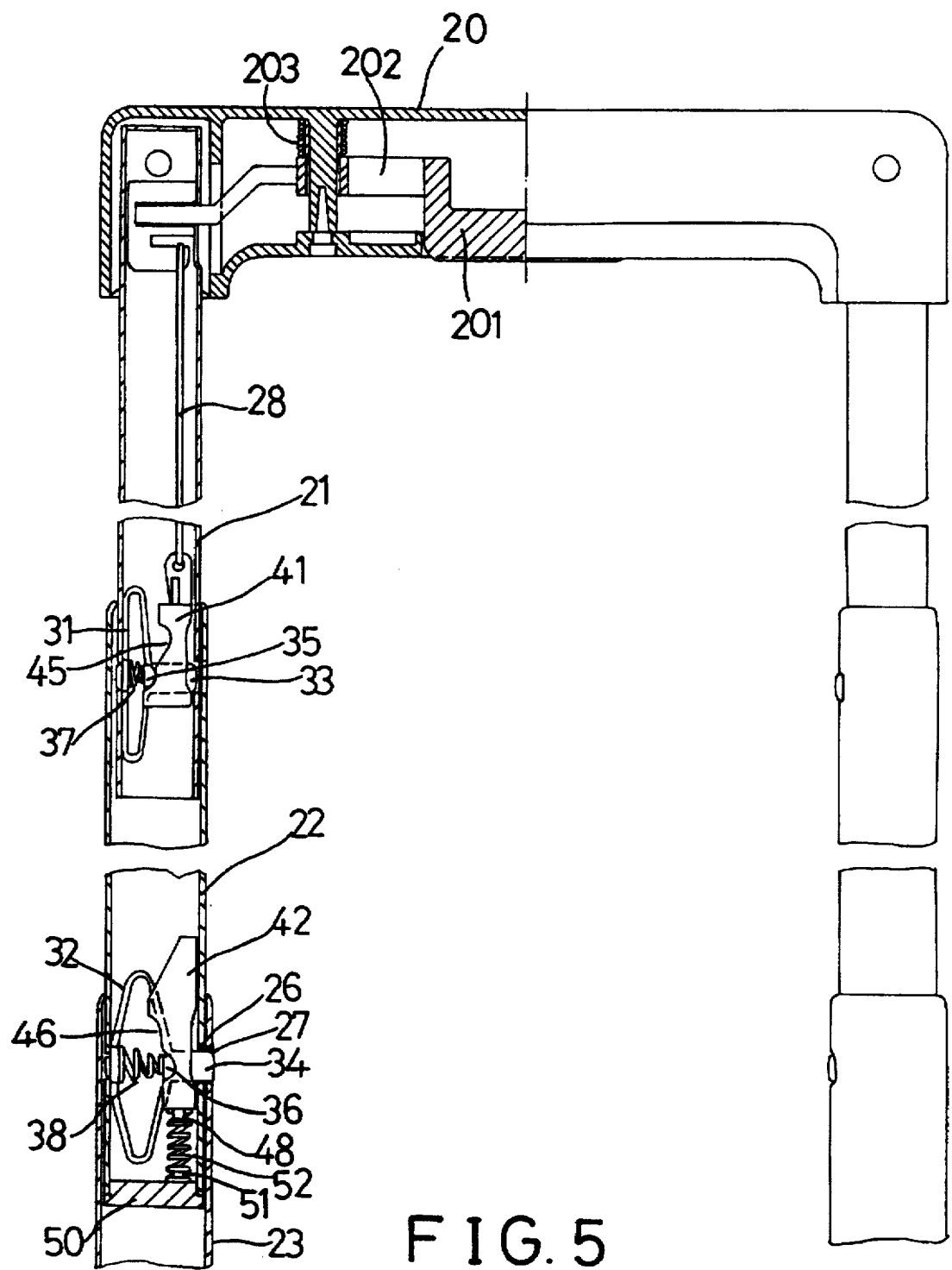

Another catch means 32 is engaged in the lower portion of the tube 22 and includes a O-shaped body having a latch 34 for engaging with the aperture 26 and with the opening 27 so as to secure the tube 22 and the duct 23 together. A spring 38 is engaged in the body 32 for biasing the latch 34 to engage with the aperture 26 and the opening 27. The latch 34 includes a pair of ears 36 oppositely and laterally extended therefrom. An actuator 42 includes an oblong hole 44 formed therein for engaging with the latch 34 and for allowing the latch 34 to slide along said oblong hole 44. The actuator 42 includes a cam surface 46 formed therein for engaging with the ears 36 and for disengaging the latch 34 from the tube 22 (FIG. 6) and for allowing the latch 34 to engage with the duct 23 (FIG. 5). A cap 50 is secured to the bottom portion of the tube 22 and includes a projection 51 extended upward therefrom. The actuator 42 includes a projection 48 extended downward therefrom. A spring 52 is engaged between the projections 48, 51 of the cap 50 and the actuator 42 for biasing the actuator 42 upward.

Figure 3:
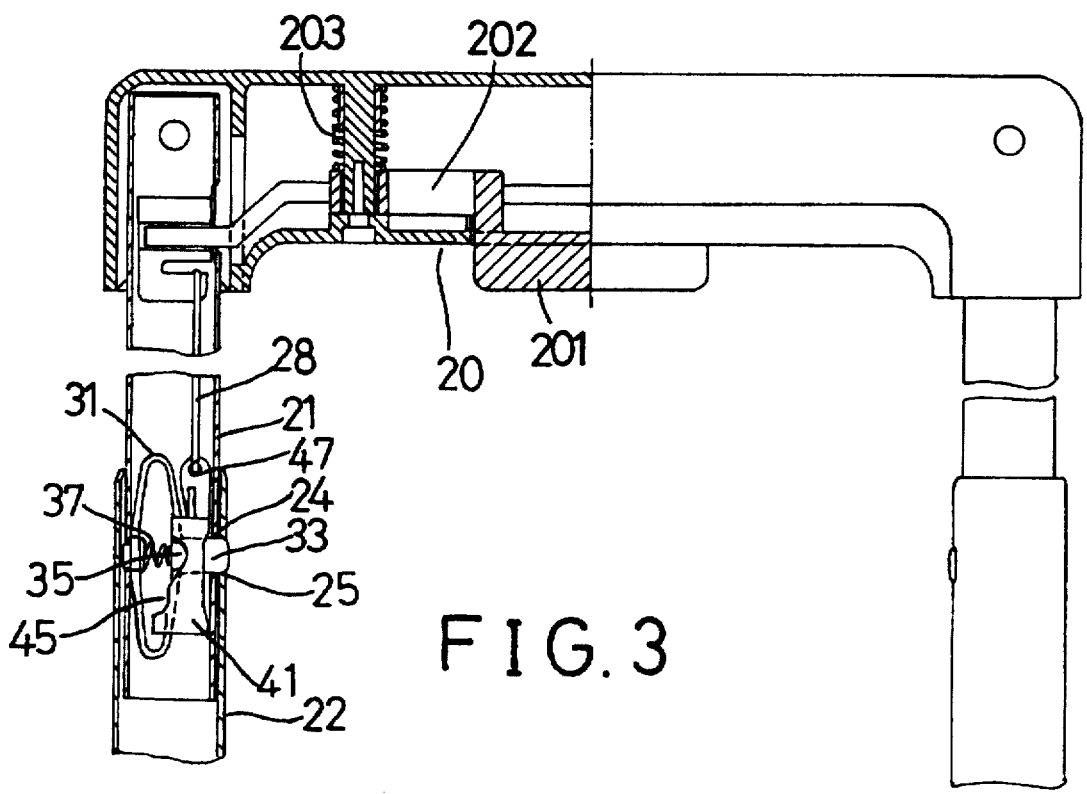
FIGS. 3, 4, 5, 6 are partial cross sectional views illustrating the operation of the retractable luggage handle assembly.
Figure 4:
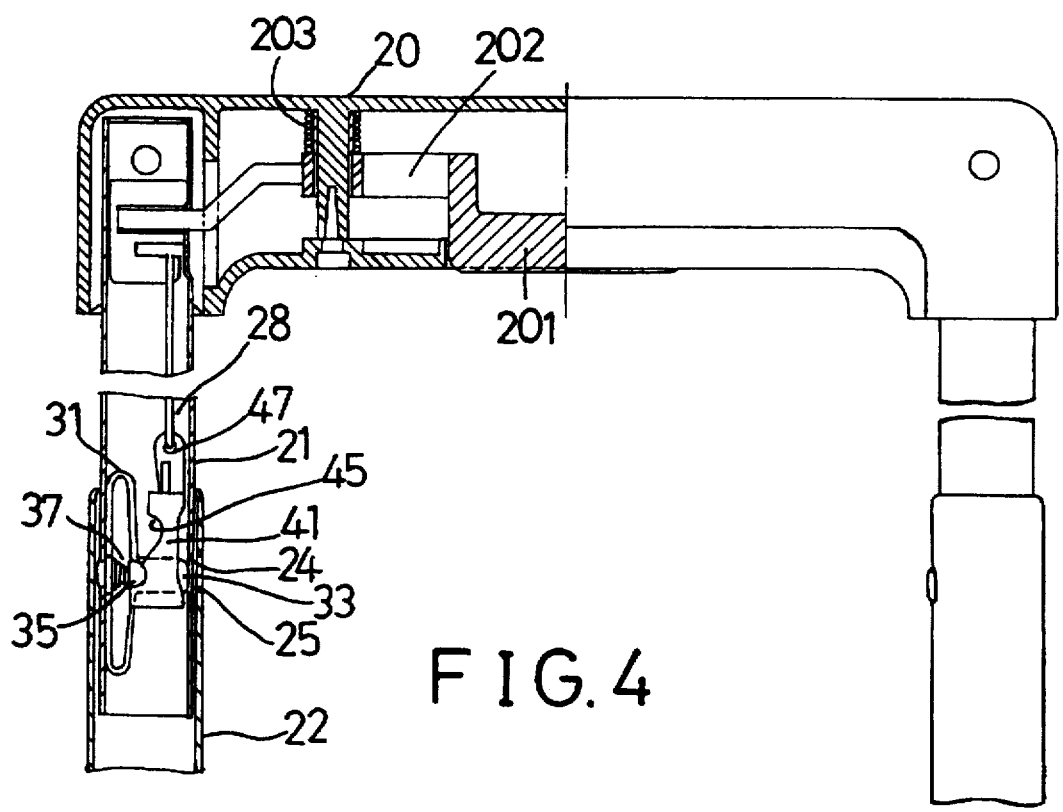

In operation, as shown in FIG. 3, when the actuator 41 is not pulled upward by the hand grip 201, the latch 33 is allowed to engage with the hole 24 and with the orifice 25 so as to secure the tube 22 and the pipe 21 together such that the pipes 21 may not be moved inward of the tubes 22.

However, as shown in FIG. 4, when the actuator 41 is pulled upward by the hand grip 201, the latch 33 is disengaged from the tube 22 by the cam surface 45 such that the pipes 21 may be moved relative to the tubes 22. When the hand grip 201 is released and when the actuator 41 and the link 28 and the beam 202 are moved downward to the position as shown in FIG. 3 by the spring 203, the cam surface 45 of the actuator 41 allows the latch 33 to engage with the tube 22 again.

Figure 6:
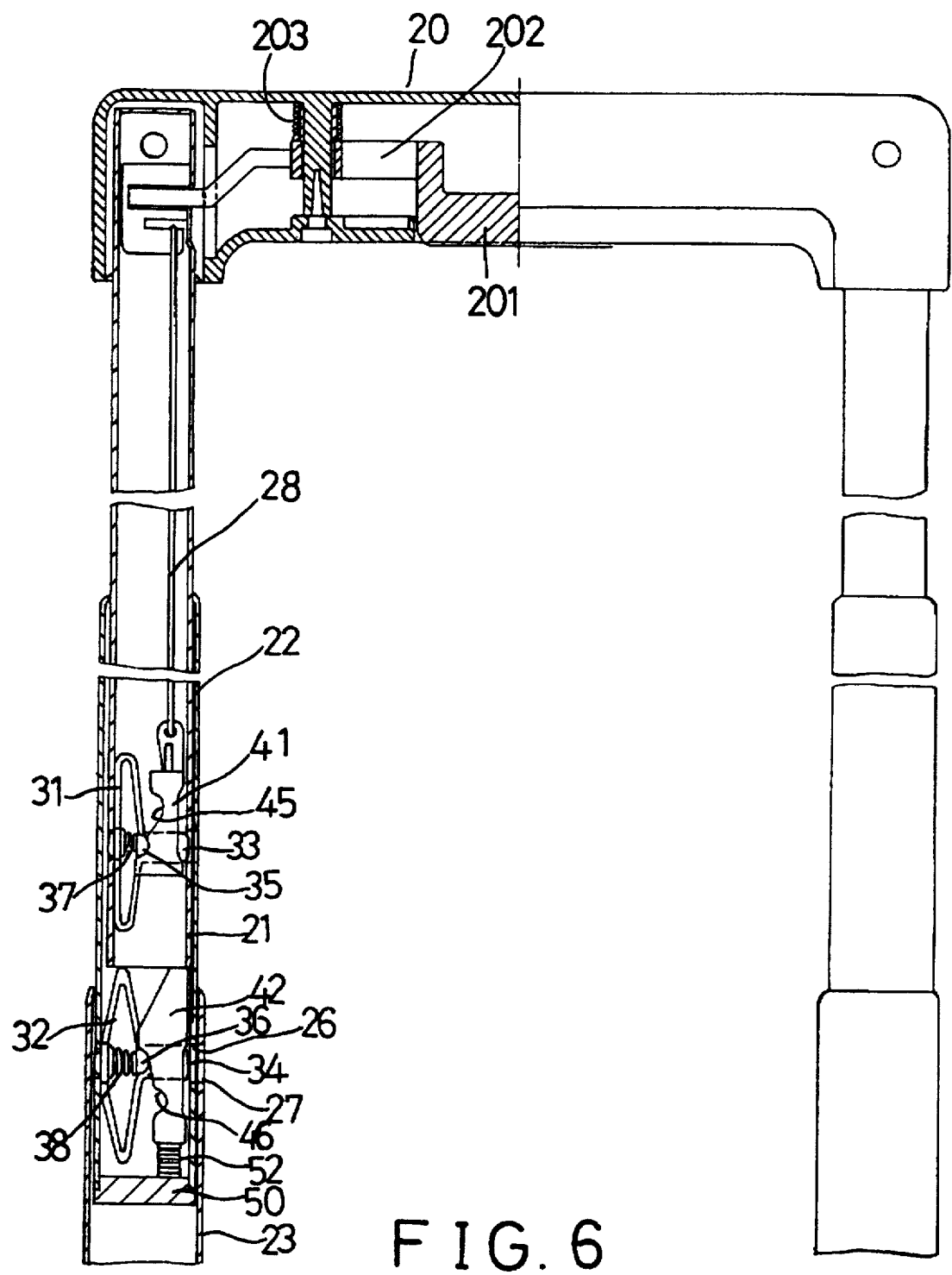

As shown in FIG. 5, the actuator 42 is biased upward by the spring 52 so as to allow the latch 34 to engage with the aperture 26 and with the opening 27 so as to secure the tube 22 and the duct 23 together such that the tubes 22 may not be moved inward of the ducts 23. However, as shown in FIG. 6, when the actuator 42 is moved upward against the spring 52 by the tubes 21, the latch 34 is disengaged from the duct 23 by the cam surface 46 such that the tubes 22 may be moved relative to the ducts 23. When the tubes 21 are disengaged from the actuators 42 and when the actuator 42 is moved upward to the position as shown in FIG. 5 by the spring 52, the cam surface 46 of the actuator 42 allows the latch 34 to engage with the duct 23 again.

Accordingly, the retractable luggage handle assembly in accordance with the present invention includes the securing means 31, 32 that may be easily operated when the hand grip 201 is operated.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A handle assembly comprising:

a pair of ducts wherein each duct includes an upper portion having an opening formed therein, a pair of tubes slidably engaged in said ducts respectively, said tubes each including a lower portion having an aperture formed therein and an upper portion having an orifice formed therein, a pair of pipes slidably engaged in said tubes wherein each pipe includes a lower portion having a hole formed therein and an upper portion having a handle secured thereon, a hand grip slidably engaged in said handle, means for biasing said hand grip downward and outward of said handle, link means engaged in said pipes and secured to said hand grip so as to be moved in concert with said hand grip, a first actuator secured to said link means and moved in concert with said link means, said first actuator including a first cam means provided therein, a first securing means engaged in said lower portion of said pipes and including a first latch means for engaging with said hole and said orifice so as to secure said pipe to said tube and so as to prevent said pipe from moving relative to said tube, and means for biasing said first latch means to engage with said hole and said orifice, said first cam means of said first actuator being engaged with said first latch means so as to disengage said first latch means from said orifice when said first actuator is moved toward said handle by said hand grip, said first latch means including at least one ear extended therefrom for engaging with said first cam means so as to allow said first latch means to be disengaged from said orifice by said first cam means, a second securing means engaged in said lower portion of said tubes and including a second latch means for engaging with said opening and said aperture so as to secure said ducts to said tubes, said second latch means including at least one ear extended therefrom, means for biasing said second latch means to engage with said opening, a second actuator including a second cam means for engaging with said ear of said second latch means, said second cam means being caused to engage with said ear of said second latch means for disengaging said second latch means from said opening when said lower portion of said pipe moves downward to engage with said second actuator, and means for biasing said second actuator toward said pipes so as to allow said second latch means to engage with said opening, said second cam means being actuated to engage with said ear of said second latch means for disengaging said second latch means from said opening when said second actuator is moved against said biasing means and when said pipe moves downward toward said second cam means.

* * * * *